(12) United States Patent
Zhang

(10) Patent No.: US 11,977,935 B2
(45) Date of Patent: May 7, 2024

(54) METHOD AND APPARATUS FOR IMPROVING MESSAGE PROCESSING EFFICIENCY OF FLASH CHANNEL CONTROLLER

(71) Applicant: INSPUR SUZHOU INTELLIGENT TECHNOLOGY CO., LTD., Suzhou (CN)

(72) Inventor: Hailun Zhang, Shandong (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/252,816

(22) PCT Filed: Sep. 28, 2021

(86) PCT No.: PCT/CN2021/121438
§ 371 (c)(1),
(2) Date: May 12, 2023

(87) PCT Pub. No.: WO2022/100312
PCT Pub. Date: May 19, 2022

(65) Prior Publication Data
US 2024/0012699 A1    Jan. 11, 2024

(30) Foreign Application Priority Data

Nov. 13, 2020 (CN) .......................... 202011266036.6

(51) Int. Cl.
*G06F 3/00* (2006.01)
*G06F 9/50* (2006.01)
*G06F 9/54* (2006.01)

(52) U.S. Cl.
CPC ............ *G06F 9/546* (2013.01); *G06F 9/5022* (2013.01)

(58) Field of Classification Search
CPC ....................................................... G06F 9/54
(Continued)

(56) References Cited

U.S. PATENT DOCUMENTS

2010/0250838 A1    9/2010 Englbrecht
2012/0005404 A1*   1/2012 Raz ..................... G06F 12/0246
                                                    711/E12.016
(Continued)

FOREIGN PATENT DOCUMENTS

CN         102346717 A      2/2012
CN         102609378 A      7/2012
(Continued)

OTHER PUBLICATIONS

Yang Hu, Exploring and Exploiting the Multilevel Parallelism Inside SSDs for Improved Performance and Endurance. (Year: 2013).*
(Continued)

*Primary Examiner* — Lechi Truong
(74) *Attorney, Agent, or Firm* — Dennemeyer & Associates LLC; Victoria Friedman

(57) ABSTRACT

A method and apparatus for improving message processing efficiency of a Flash channel controller are provided. The method includes: S1, after receiving a request message of a functional unit, a Flash interface parses the request message, and constructs a request response message according to a parsing result, wherein the request response message includes a state of the request message; S2, the Flash interface returns the request response message to the functional unit; and S3, the functional unit acquires the state of the request message according to the request response message, and makes, according to whether the state of the request message is normal, a response to the request message before receiving a completion message.

17 Claims, 3 Drawing Sheets

(58) Field of Classification Search
USPC .......................................................... 719/310
See application file for complete search history.

(56) References Cited

U.S. PATENT DOCUMENTS

2018/0349026 A1* 12/2018 Richter ............... G06F 13/1642
2019/0303314 A1* 10/2019 Li ........................... G06F 3/061
2021/0405924 A1* 12/2021 Muthiah ............... G06F 3/0619

FOREIGN PATENT DOCUMENTS

| | | |
|---|---|---|
| CN | 107547421 A | 1/2018 |
| CN | 110602211 A | 12/2019 |
| CN | 110677220 A | 1/2020 |
| CN | 112463365 A | 3/2021 |

OTHER PUBLICATIONS

International search report for PCT/CN2021/121438 dated Dec. 29, 2021.
Search report for Chinese application 202011266036.6, filed Nov. 13, 2020.

* cited by examiner

METHOD AND APPARATUS FOR IMPROVING MESSAGE PROCESSING EFFICIENCY OF FLASH CHANNEL CONTROLLER

CROSS-REFERENCE TO RELATED APPLICATIONS

This is a 35 U.S.C. 371 National Stage Patent Application of International Application No. PCT/CN2021/121438, filed Sep. 28, 2021, which claims priority to Chinese application 202011266036.6, filed Nov. 13, 2020, each of which is hereby incorporated by reference in its entirety.

TECHNICAL FIELD

The present disclosure relates to the technical field of Flash firmware processing, and particularly relates to a method and apparatus for improving message processing efficiency of a Flash channel controller.

BACKGROUND

During a process of processing a message by a Flash channel controller, a functional unit completes the maintenance of the context, and a Flash interface completes the message forwarding between an upper layer and each Flash channel controller. However, the above process is tedious, and the functional unit may release the context resource only after waiting for the completion of the entire process. In addition, in a case of data processing abnormality of the Flash channel controller, the functional unit may only know the situation until the end of the process, such that the efficiency is extremely low.

The above are the defects in the related art. With regard to the above defects in the related art, it is necessary to provide a method and apparatus for improving message processing efficiency of a Flash channel controller.

SUMMARY

In view of the defects of tedious process and low efficiency in the process that a Flash interface processes a message between a functional unit and a Flash channel controller, embodiments of the present disclosure provide a method and apparatus for improving message processing efficiency of a Flash channel controller, so as to solve the above technical problems.

In a first aspect, the embodiments of the present disclosure provide a method for improving message processing efficiency of a Flash channel controller. The method includes following operations.

S1, after receiving a request message of a functional unit, a Flash interface parses the request message, and constructs a request response message according to a parsing result, wherein the request response message includes a state of the request message;

S2, the Flash interface returns the request response message to the functional unit; and S3, the functional unit acquires the state of the request message according to the request response message, and makes, according to whether the state of the request message is normal, a response to the request message before receiving a completion message.

Further, operation S1 includes:

S11, a request response external message queue and a request internal message queue are created at the Flash interface, wherein the request response external message queue is in one-to-one correspondence with the request internal message queue;

S12, after receiving the current request message of the functional unit, the Flash interface parses the current request message, and adds the parsed request message into the request internal message queue, where the parsed request message waits to be distributed to the corresponding Flash channel controller;

S13, the Flash interface constructs the request response message, wherein the request response message includes a sending state of the current request message, a stream number to which the current request message belongs, and a message count of the stream number to which the current request message belongs; and S14, the Flash interface adds the request response message into the request response external message queue.

Further, operation S2 includes:

S21, the Flash interface extracts the request response message from the request response external message queue, and returns the request response message to the functional unit;

S22, the Flash interface judges whether the request response external message queue is empty;

when the request response external message queue is empty, the flow proceeds to operation S3; and when the request response external message queue is not empty, the flow returns to operation S21.

Further, operation S3 includes:

S31, the functional unit parses the state of the request message from the received request response message;

S32, the functional unit judges whether the state of the request message is normal;

when the state of the request message is normal, the flow proceeds to operation S33;

when the state of the request message is abnormal, the flow proceeds to operation S34;

S33, the functional unit releases a context resource before receiving the completion message, and the flow ends; and S34, the functional unit re-transmits the abnormal request message.

Further, the operation S3 further includes the following operations:

S35, the functional unit parses, from the received request response message, the message count of the stream number to which the request message belongs;

S36, the functional unit judges whether the message count of the stream number to which the request message belongs is within a set threshold value range;

when the message count of the stream number to which the request message belongs is within the set threshold value range, the functional unit maintains current frequency of sending the request message;

when the message count of the stream number to which the request message belongs is lower than a set threshold value lower limit, the functional unit increases the frequency of sending the request message; and when the message count of the stream number to which the request message belongs is higher than a set threshold value upper limit, the functional unit decreases the frequency of sending the request message.

In a second aspect, the embodiments of the present disclosure provide an apparatus for improving message processing efficiency of a Flash channel controller, including:

a request response message construction module, adapted to configure a Flash interface to, after receiving a request message of a functional unit, parse the request message, and construct a request response message according to a parsing result, wherein the request response message includes a state of the request message;

a request response message return module, adapted to configure the Flash interface to return the request response message to the functional unit; and a request message response module, adapted to configure the functional unit to acquire the state of the request message according to the request response message, and make, according to whether the state of the request message is normal, a response to the request message before receiving a completion message.

Further, the request response message construction module includes:

a message queue creation unit, adapted to create a request response external message queue and a request internal message queue at the Flash interface, wherein the request response external message queue is in one-to-one correspondence with the request internal message queue;

a request message queue adding unit, adapted to configure the Flash interface to, after receiving the current request message of the functional unit, parse the current request message, and add the parsed request message into the request internal message queue, where the parsed request message waits to be distributed to the corresponding Flash channel controller;

a request response message construction unit, adapted to configure the Flash interface to construct the request response message, wherein the request response message includes a sending state of the current request message, a stream number to which the current request message belongs, and a message count of the stream number to which the current request message belongs; and a request response message queue adding unit, adapted to configure the Flash interface to add the request response message into the request response external message queue.

Further, the request response message return module includes:

a request response message return unit, adapted to configure the Flash interface to extract the request response message from the request response external message queue, and return the request response message to the functional unit; and a response external message queue judging unit, adapted to configure the Flash interface to judge whether the request response external message queue is empty.

Further, the request message response module includes:

a request message state parsing unit, adapted to configure the functional unit to parse the state of the request message from the received request response message;

a request message state judging unit, adapted to configure the functional unit to judge whether the state of the request message is normal;

a context resource release unit, adapted to, when the state of the request message is normal, configure the functional unit to release a context resource before receiving the completion message; and a request message re-transmission unit, adapted to, when the state of the request message is abnormal, configure the functional unit to re-transmit the abnormal request message.

Further, the request message response module further includes:

a message count parsing unit, adapted to configure the functional unit to parse, from the received request response message, the message count of the stream number to which the request message belongs;

a message count judging unit, adapted to configure the functional unit to judge whether the message count of the stream number to which the request message belongs is within a set threshold value range;

a request message sending frequency maintaining unit, adapted to, when the message count is within the set threshold value range, configure the functional unit to maintain current frequency of sending the request message;

a request message sending frequency increase unit, adapted to, when the message count of the stream number to which the request message belongs is lower than a set threshold value lower limit, configure the functional unit to increase the frequency of sending the request message; and a request message sending frequency decrease unit, adapted to, when the message count of the stream number to which the request message belongs is higher than a set threshold value upper limit, configure the functional unit to decrease the frequency of sending the request message.

The present disclosure has beneficial effects as follows.

According to the method and apparatus for improving the message processing efficiency of the Flash channel controller provided in the embodiments of the present disclosure, the request response message is additionally introduced in the Flash interface, when the processing of the request message is abnormal, a response may be made to the current request message more quickly, so as to perform message repetition; and when the processing of the request message is normal, the context resource may be released in advance. Moreover, a specific response may also be made according to a parameter in the request response message, thereby optimizing the performance of distributing and processing the message.

BRIEF DESCRIPTION OF THE DRAWINGS

To illustrate technical solutions in the embodiments of the present disclosure or in the related art more clearly, a brief introduction on the drawings which are needed in the description of the embodiments or the related art is given below. Apparently, for those having ordinary skill in the art, other drawings may also be obtained according to these drawings without any creative effort.

Figure 1:
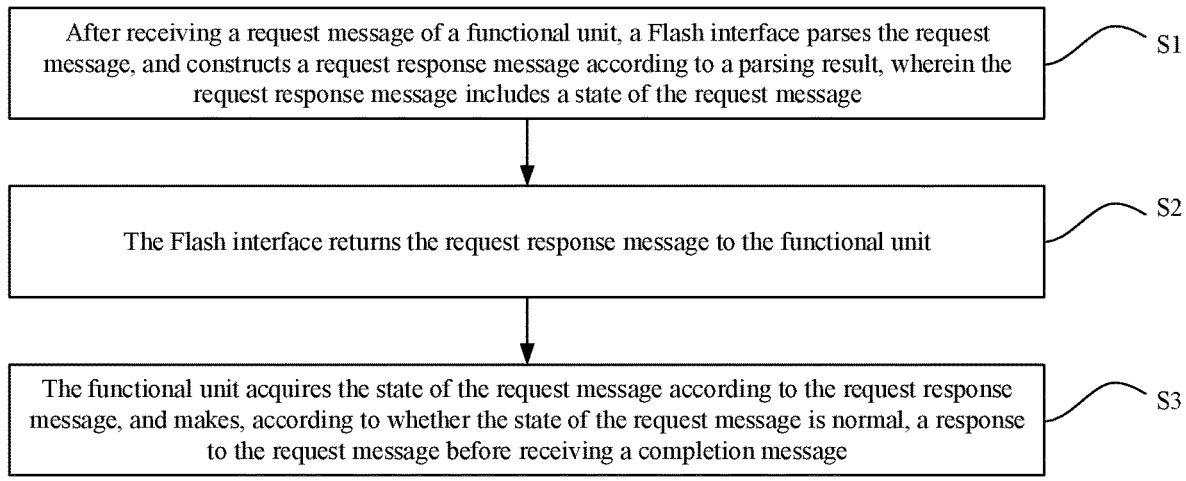
FIG. 1 is a first schematic flowchart of a method of the embodiments of the present disclosure.

In the figures, 1—request response message construction module; 1.1—message queue creation unit; 1.2—request message queue adding unit; 1.3—request response message construction unit; 1.4—request response message queue adding unit; 2—request response message return module; 2.1—request response message return unit; 2.2—response external message queue judging unit; 3—request message response module; 3.1—request message state parsing unit; 3.2—request message state judging unit; 3.3—context resource release unit; 3.4—request message re-transmission unit; 3.5—message count parsing unit; 3.6—message count judging unit; 3.7—request message sending frequency maintaining unit; 3.8—request message sending frequency increase unit; 3.9—request message sending frequency decrease unit.

DETAILED DESCRIPTION

According to a related art, a process of processing a message by a Flash channel controller is generally as follows.

A functional unit constructs and sends a request message, and in order to implement abnormality processing, the current context needs to be saved, wherein the current context includes various parameter information of the current request message.

After receiving the request message sent by the functional unit, a Flash interface parses the request message and distributes the request message to a corresponding Flash channel controller.

The Flash channel controller executes an operation indicated in the request message, constructs a completion message after executing the operation, and sends the completion message to a Flash interface.

After receiving the completion message sent by the Flash channel controller, the Flash interface parses the completion message and distributes the completing message to the functional unit.

The functional unit receives the completion message, parses corresponding context and completes remaining operations, and releases a context resource after completing the operations.

During a process of processing a message by a Flash channel controller, a functional unit completes the maintenance of the context, and a Flash interface completes the message forwarding between an upper layer and each Flash channel controller. However, the above process is tedious, and the functional unit may release the context resource only after waiting for the completion of the entire process. In addition, in a case of data processing abnormality of the Flash channel controller, the functional unit may only know the situation until the end of the process, such that the efficiency is extremely low.

Aiming at the defects in the related art, a method and apparatus for improving message processing efficiency of a Flash channel controller are provided in the embodiments of the present disclosure.

In order that those having ordinary skill in the art may better understand the technical solutions in the present disclosure, a clear and complete description of the technical solutions in the embodiments of the present disclosure will be given below, in combination with the drawings in the embodiments of the present disclosure. Apparently, the embodiments described below are merely a part, but not all, of the embodiments of the present disclosure. All of other embodiments, obtained by those having ordinary skill in the art based on the embodiments in the present disclosure without any creative effort, fall into the protection scope of the present disclosure.

As shown in FIG. 1, the embodiments of the present disclosure provide a method for improving message processing efficiency of a Flash channel controller. The method includes the following operations.

S1, after receiving a request message of a functional unit, a Flash interface parses the request message, and constructs a request response message according to a parsing result, wherein the request response message includes a state of the request message;

S2, the Flash interface returns the request response message to the functional unit; and S3, the functional unit acquires the state of the request message according to the request response message, and makes, according to whether the state of the request message is normal, a response to the request message before receiving a completion message.

According to the method for improving the message processing efficiency of the Flash channel controller provided in the present embodiment, the request response message is additionally introduced in the Flash interface, the Flash interface returns the request response message to the functional unit, and the functional unit receives the request response message returned by the Flash interface and acquires the state of the request message from the request response message, so that before the functional unit receives the completion message, the following operations may be realized: when the processing of the request message is abnormal, a response may be made to the current request message more quickly, so as to perform message repetition; when the processing of the request message is normal, a context resource may be released in advance. Moreover, a specific response may also be made according to a parameter in the request response message, thereby optimizing the performance of distributing and processing the message.

Figure 2:
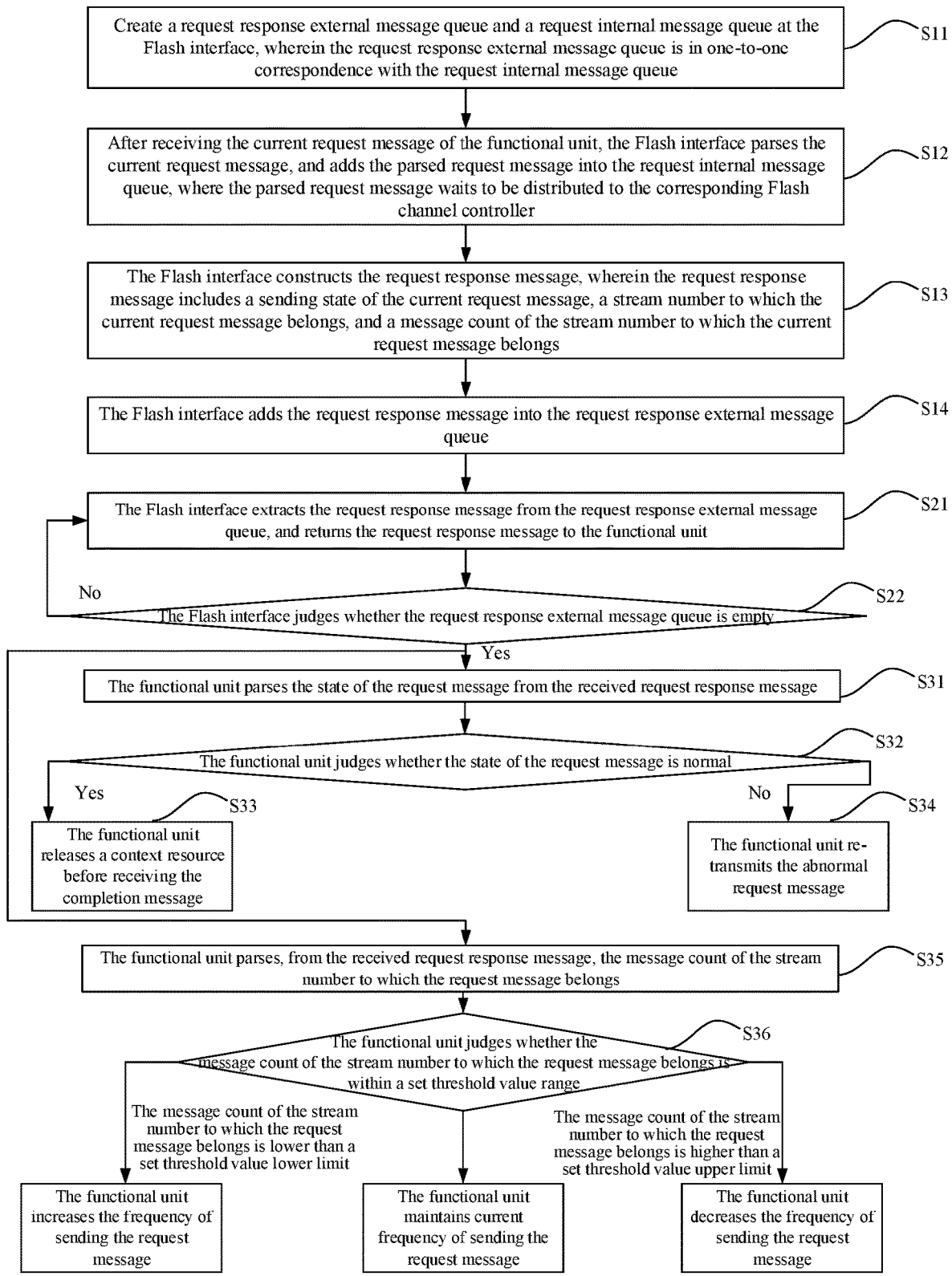
FIG. 2 is a second schematic flowchart of a method of the embodiments of the present disclosure.

As shown in FIG. 2, the embodiments of the present disclosure provide a method for improving message processing efficiency of a Flash channel controller, including the following operations.

S1, after receiving a request message of a functional unit, a Flash interface parses the request message, and constructs a request response message according to a parsing result, wherein the request response message includes a state of the request message. The specific operations for S1 are as follows:

S11, a request response external message queue and a request internal message queue are created at the Flash interface, wherein the request response external message queue is in one-to-one correspondence with the request internal message queue;

S12, after receiving the current request message of the functional unit, the Flash interface parses the current request message, and adds the parsed request message into the request internal message queue, where the parsed request message waits to be distributed to the corresponding Flash channel controller;

S13, the Flash interface constructs the request response message, wherein the request response message includes a sending state of the current request message, a stream number to which the current request message belongs, and a message count of the stream number to which the current request message belongs; and S14, the Flash interface adds the request response message into the request response external message queue.

Aiming at the problems of message loss, message repetition, message blank, message blocking and the like, which are difficult to be defined and often occur in a message transmission queue from the functional unit to the Flash interface in the related art, by means of respectively constructing the request internal message queue (which is used for waiting for distribution to the corresponding Flash channel controller) and the request response external message queue (which is used for extracting the request response message and returning the request response message to the functional unit), which are in one-to-one correspondence, all request messages and corresponding request response messages may be managed from the Flash interface side, and corresponding request response message in the request response external message queue may be found according to any request message in the internal message queue, or corresponding request message in the internal message queue may be found according to any request response message in the request response external message queue, thereby facilitating the search of the Flash interface and realizing ordered processing.

S2, the Flash interface returns the request response message to the functional unit, wherein the specific operations are as follows:

S21, the Flash interface extracts the request response message from the request response external message queue, and returns the request response message to the functional unit;

S22, the Flash interface judges whether the request response external message queue is empty;

when the request response external message queue is empty, the flow proceeds to operation S3; and when the request response external message queue is not empty, the flow returns to operation S21;

S3, the functional unit acquires the state of the request message according to the request response message, and makes, according to whether the state of the request message is normal, a response to the request message before receiving a completion message, wherein the specific operations are as follows:

S31, the functional unit parses the state of the request message from the received request response message;

S32, the functional unit judges whether the state of the request message is normal;

when the state of the request message is normal, the flow proceeds to operation S33;

when the state of the request message is abnormal, the flow proceeds to operation S34;

S33, the functional unit releases a context resource before receiving the completion message, and the flow ends; and S34, the functional unit re-transmits the abnormal request message.

By means of the above operations, when it is judged that the processing of the request message is normal, the functional unit may release the context resource in advance before receiving the completion message, so that the context resource may be immediately used in the next request message, thereby greatly improving the utilization rate of the limited context resource. When it is judged that the processing of the request message is abnormal, the functional unit may re-transmit the request message subjected to abnormal processing more quickly before receiving the completion message, thereby reducing the response time consumption of the functional unit. Moreover, after the functional unit confirms according to the request response message that the processing of the sent request message is normal, the functional unit may also know that the request message queue has an idle position, so that a message may be continuously sent to the queue, the response time consumption of the functional unit is also reduced, and the performance of the functional unit is improved.

In some embodiments, operation S3 further includes the following operations:

S35, the functional unit parses, from the received request response message, the message count of the stream number to which the request message belongs;

S36, the functional unit judges whether the message count of the stream number to which the request message belongs is within a set threshold value range;

when the message count of the stream number to which the request message belongs is within the set threshold value range, the functional unit maintains current frequency of sending the request message;

when the message count of the stream number to which the request message belongs is lower than a set threshold value lower limit, the functional unit increases the frequency of sending the request message; and when the message count of the stream number to which the request message belongs is higher than a set threshold value upper limit, the functional unit decreases the frequency of sending the request message.

If the frequency of sending the request message is too low, the deserved performance of the functional unit is not exerted, which may result in a product performance bottleneck. If the frequency of sending the request message is too high, the pressure of the functional unit sending the request message may be too large, and CPU resources are preempted, thereby affecting the normal performance of other functional units. By means of the above operations, the frequency of sending the request message may be automatically increased or decreased according to a comparison result of the message count of the stream number to which the request message belongs and the upper limit and the lower limit of the set threshold value range, thereby realizing the dynamic adaptive adjustment of the frequency of sending the request message, preventing the request message from being sent too fast or too slow, and facilitating to improve the performance of the functional unit.

Figure 3:
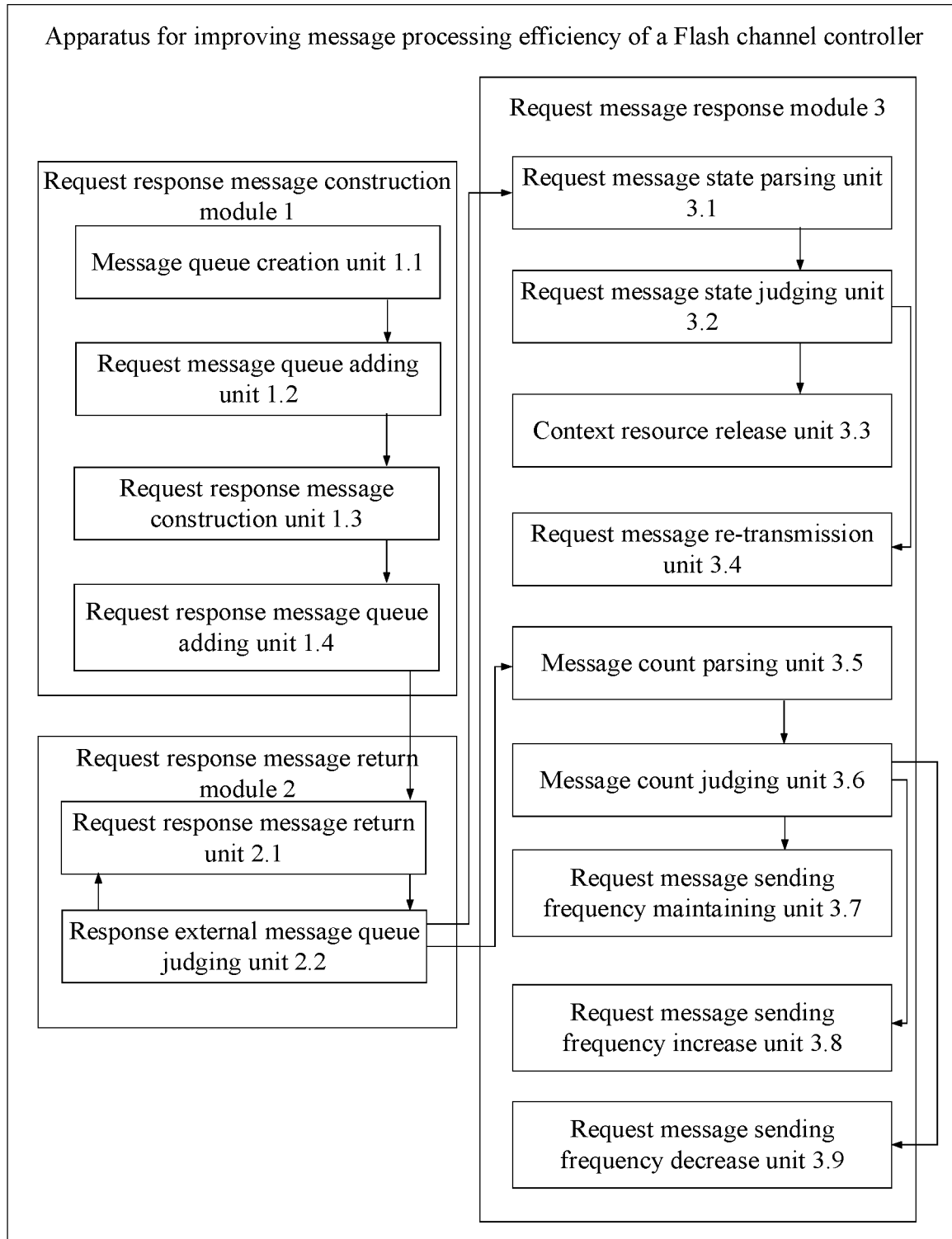
FIG. 3 is a schematic diagram of a system of the embodiments of the present disclosure.

As shown in FIG. 3, the embodiments of the present disclosure provide an apparatus for improving message processing efficiency of a Flash channel controller, including:

a request response message construction module 1, adapted to configure a Flash interface to, after receiving a request message of a functional unit, parse the request message, and construct a request response message according to a parsing result, wherein the request response message includes a state of the request message, wherein the request response message construction module 1 includes:

a message queue creation unit 1.1, adapted to create a request response external message queue and a request internal message queue at the Flash interface, wherein the request response external message queue is in one-to-one correspondence with the request internal message queue;

a request message queue adding unit 1.2, adapted to configure the Flash interface to, after receiving the current request message of the functional unit, parse the current request message, and add the parsed request message into the request internal message queue, where the parsed request message waits to be distributed to the corresponding Flash channel controller;

a request response message construction unit 1.3, adapted to configure the Flash interface to construct the request response message, wherein the request response message includes a sending state of the current request message, a stream number to which the current request message belongs, and a message count of the stream number to which the current request message belongs; and a request response message queue adding unit 1.4, adapted to configure the Flash interface to add the request response message into the request response external message queue.

Aiming at the problems of message loss, message repetition, message blank, message blocking and the like, which are difficult to be defined and often occur in a message transmission queue from the functional unit to the Flash interface in the related art, the request response message construction module 1 respectively constructs the request internal message queue (which is used for waiting for distribution to the corresponding Flash channel controller) and the request response external message queue (which is used for extracting the request response message and returning the request response message to the functional unit), which are in one-to-one correspondence, therefore all request messages and corresponding request response messages may be managed from the Flash interface side, and corresponding request response message in the request response external message queue may be found according to any request message in the internal message queue, or corresponding request message in the internal message queue may be found according to any request response message in the request response external message queue, thereby facilitating the search of the Flash interface and realizing ordered processing.

A request response message return module 2, adapted to configure the Flash interface to return the request response message to the functional unit, wherein the request response message return module 2 includes:

a request response message return unit 2.1, adapted to configure the Flash interface to extract the request response message from the request response external message queue, and return the request response message to the functional unit; and a response external message queue judging unit 2.2, adapted to configure the Flash interface to judge whether the request response external message queue is empty;

a request message response module 3, adapted to configure the functional unit to acquire the state of the request message according to the request response message, and make, according to whether the state of the request message is normal, a response to the request message before receiving a completion message, wherein the request message response module 3 includes:

a request message state parsing unit 3.1, adapted to configure the functional unit to parse the state of the request message from the received request response message;

a request message state judging unit 3.2, adapted to configure the functional unit to judge whether the state of the request message is normal;

a context resource release unit 3.3, adapted to, when the state of the request message is normal, configure the functional unit to release a context resource before receiving the completion message; and a request message re-transmission unit 3.4, adapted to, when the state of the request message is abnormal, configure the functional unit to re-transmit the abnormal request message;

a message count parsing unit 3.5, adapted to configure the functional unit to parse, from the received request response message, the message count of the stream number to which the request message belongs;

a message count judging unit 3.6, adapted to configure the functional unit to judge whether the message count of the stream number to which the request message belongs is within a set threshold value range;

a request message sending frequency maintaining unit 3.7, adapted to, when the message count is within the set threshold value range, configure the functional unit to maintain current frequency of sending the request message;

a request message sending frequency increase unit 3.8, adapted to, when the message count of the stream number to which the request message belongs is lower than a set threshold value lower limit, configure the functional unit to increase the frequency of sending the request message; and a request message sending frequency decrease unit 3.9, adapted to, when the message count of the stream number to which the request message belongs is higher than a set threshold value upper limit, configure the functional unit to decrease the frequency of sending the request message.

By means of the request message state parsing unit 3.1, the request message state judging unit 3.2, the context resource release unit 3.3 and the request message re-transmission unit 3.4 in the request message response module 3, when it is judged that the processing of the request message is normal, the functional unit may release the context resource in advance before receiving the completion message, so that the context resource may be immediately used in the next request message, thereby greatly improving the utilization rate of the limited context resource; and when it is judged that the processing of the request message is abnormal, the functional unit may re-transmit the request message subjected to abnormal processing more quickly before receiving the completion message, thereby reducing the response time consumption of the functional unit. Moreover, after the functional unit confirms according to the request response message that the processing of the sent request message is normal, the functional unit may also know that the request message queue has an idle position, so that a message may be continuously sent to the queue, the response time consumption of the functional unit is also reduced, and the performance of the functional unit is improved.

If the frequency of sending the request message is too low, the deserved performance of the functional unit is not exerted, which may result in a product performance bottleneck. If the frequency of sending the request message is too high, the pressure of the functional unit sending the request message may be too large, and CPU resources are preempted, thereby affecting the normal performance of other functional units. By means of the message count parsing unit 3.5, the message count judging unit 3.6, the request message sending frequency maintaining unit 3.7, the request message sending frequency increase unit 3.8 and the request message sending frequency decrease unit 3.9 in the request message response module 3, the frequency of sending the request message may be automatically increased or decreased according to a comparison result of the message count of the stream number to which the request message belongs and the upper limit and the lower limit of the set threshold value range, thereby realizing the dynamic adaptive adjustment of the frequency of sending the request message, preventing the request message from being sent too fast or too slow, and facilitating to improve the performance of the functional unit.

Although the present disclosure is described in detail with reference to the drawings and in combination with exemplary embodiments, the present disclosure is not limited thereto. Without departing from the principle and essence of the present disclosure, those having ordinary skill in the art may make various equivalent modifications or substitutions to the embodiments of the present disclosure, and these modifications or substitutions should fall within the coverage range of the present disclosure, or, any changes or substitutions readily conceivable to those having ordinary skill in the art who are familiar with this art within the technical scope disclosed in the present disclosure should all fall within the protection scope of the present disclosure. Therefore, the protection scope of the present disclosure should be subject to the protection scope of the claims.

What is claimed is:

1. A method for improving message processing efficiency of a Flash channel controller, comprising following operations: S1, after receiving a request message of a functional unit, parsing, by a Hash interface, the request message, and constructing, by the Flash interface, a request response message according to a parsing result, wherein the request response message comprises a state of the request message; S2, returning, by the Flash interface, the request response message to the functional unit; and S3, acquiring, by the functional unit, the state of the request message according to the request response message, and making, by the functional unit according to whether the state of the request message is normal, a response to the request message before receiving a completion message;

wherein operation S1 comprises: S11, creating a request response external message queue and a request internal message queue at the Hash interface, wherein the request response external message queue is in one-to-one correspondence with the request internal message queue; S12, after receiving the current request message of the functional unit, parsing, by the Hash interface, the current request message, and adding, by the Flash interface, the parsed request message into the request internal message queue, where the parsed request message waits to be distributed to the corresponding Hash channel controller; S13, constructing, by the Flash interface, the request response message, wherein the request response message comprises a sending state of the current request message, a stream number to which the current request message belongs, and a message count of the stream number to which the current request message belongs; and S14, adding, by the Flash interface, the request response message into the request response external message queue;

S21, extracting, by the Flash interface, the request response message from the request response external message queue, and returning, by the Flash interface, the request response message to the functional unit; S22, judging, by the Flash interface, whether the request response external message queue is empty; when the request response external message queue is empty, proceeding to operation S3; and when the request response external message queue is not empty, returning to operation S21;

wherein operation S3 further comprises: S35, parsing, by the functional unit from the received request response message, the message count of the stream number to which the request message belongs; S36, judging, by the functional unit, whether the message count of the stream number to which the request message belongs is within a set threshold value range; when the message count of the stream number to which the request message belongs is within the set threshold value range, maintaining, by the functional unit, current frequency of sending the request message; when the message count of the stream number to which the request message belongs is lower than a set threshold value lower limit, increasing, by the functional unit, the frequency of sending the request message; and when the message count of the stream number to which the request message belongs is higher than a set threshold value upper limit, decreasing, by the functional unit, the frequency of sending the request message.

2. The method for improving the message processing efficiency of the Flash channel controller according to claim 1, wherein operation S3 comprises: S31, parsing, by the functional unit, the state of the request message from the received request response message; S32, judging, by the functional unit, whether the state of the request message is normal; when the state of the request message is normal, proceeding to operation S33; when the state of the request message is abnormal, proceeding to operation S34; S33, releasing, by the functional unit, a context resource before receiving the completion message, and ending; and S34, re-transmitting, by the functional unit, the abnormal request message.

3. The method for improving the message processing efficiency of the Hash channel controller according to claim 2, further comprising: when the state of the request message is normal, determining, by the functional unit, that the request message queue has an idle position, and continuously sending, by the functional unit, a request message to the request message queue.

4. The method for improving the message processing efficiency of the Flash channel controller according to claim 1, wherein the request internal message queue is used for waiting for distribution to the corresponding Hash channel controller.

5. The method for improving the message processing efficiency of the Flash channel controller according to claim 1, wherein the request response external message queue is used for extracting the request response message and returning the request response message to the functional unit.

6. The method for improving the message processing efficiency of the Flash channel controller according to claim 1, wherein all request messages and corresponding request response messages are managed by the Flash interface based on the one-to-one correspondence.

7. The method for improving the message processing efficiency of the Hash channel controller according to claim 6, wherein corresponding request response message in the request response external message queue is able to be found according to any request message in the internal message queue, or corresponding request message in the internal message queue is able to be found according to any request response message in the request response external message queue.

8. An apparatus for improving message processing efficiency of a Hash channel controller, the apparatus comprising computer which includes a Flash interface and a functional unit, wherein:

Hash interface is configured to, S1 after receiving a request message of a functional unit, parse the request message, and construct a request response message according to a parsing result, wherein the request response message comprises a state of the request message;

the Flash interface is configured to S2 return the request response message to the functional unit;

and the functional unit is configured to S3 acquire the state of the request message according to the request response message, and make, according to whether the state of the request message is normal, a response to the request message before receiving a completion message;

wherein operation S1 comprises: S11, creating a request response external message queue and a request internal message queue at the Hash interface, wherein the request response external message queue is in one-to-one correspondence with the request internal message queue; S12, after receiving the current request message of the functional unit, parsing, by the Hash interface, the current request message, and adding, by the Flash interface, the parsed request message into the request internal message queue, where the parsed request message waits to be distributed to the corresponding Hash channel controller; S13, constructing, by the Flash interface, the request response message, wherein the request response message comprises a sending state of the current request message, a stream number to which the current request message belongs, and a message count of the stream number to which the current request message belongs; and S14, adding, by the Flash interface, the request response message into the request response external message queue;

S21, extracting, by the Flash interface, the request response message from the request response external message queue, and returning, by the Flash interface, the request response message to the functional unit; S22, judging, by the Flash interface, whether the request response external message queue is empty; when the request response external message queue is empty, proceeding to operation S3; and when the request response external message queue is not empty, returning to operation S21;

wherein operation S3 further comprises: S35, parsing, by the functional unit from the received request response message, the message count of the stream number to which the request message belongs; S36, judging, by the functional unit, whether the message count of the stream number to which the request message belongs is within a set threshold value range; when the message count of the stream number to which the request message belongs is within the set threshold value range, maintaining, by the functional unit, current frequency of sending the request message; when the message count of the stream number to which the request message belongs is lower than a set threshold value lower limit, increasing, by the functional unit, the frequency of sending the request message; and when the message count of the stream number to which the request message belongs is higher than a set threshold value upper limit, decreasing, by the functional unit, the frequency of sending the request message.

9. The apparatus for improving the message processing efficiency of the Flash channel controller according to claim 8, a request response external message queue and a request internal message queue are created at the Flash interface, wherein the request response external message queue is in one-to-one correspondence with the request internal message queue;

the Flash interface is configured to, after receiving the current request message of the functional unit, parse the current request message, and add the parsed request message into the request internal message queue, where the parsed request message waits to be distributed to the corresponding Flash channel controller;

the Flash interface is configured to construct the request response message, wherein the request response message comprises a sending state of the current request message, a stream number to which the current request message belongs, and a message count of the stream number to which the current request message belongs;

and the Flash interface is configured to add the request response message into the request response external message queue.

10. The apparatus for improving the message processing efficiency of the Flash channel controller according to claim 9, wherein the Flash interface is configured to extract the request response message from the request response external message queue, and return the request response message to the functional unit; and the Flash interface is configured to judge whether the request response external message queue is empty.

11. The apparatus for improving the message processing efficiency of the Flash channel controller according to claim 10, wherein the functional unit is configured to parse the state of the request message from the received request response message;

the functional unit is configured to judge whether the state of the request message is normal;

the functional unit is configured, when the state of the request message is normal, to release a context resource before receiving the completion message;

and the functional unit is configured, when the state of the request message is abnormal, to re-transmit the abnormal request message.

12. The apparatus for improving the message processing efficiency of the Flash channel controller according to claim 11, wherein the functional unit is configured to parse, from the received request response message, the message count of the stream number to which the request message belongs;

the functional unit is configured to judge whether the message count of the stream number to which the request message belongs is within a set threshold value range;

the functional unit is configured, when the message count is within the set threshold value range, to maintain current frequency of sending the request message;

the functional unit is configured, when the message count of the stream number to which the request message belongs is lower than a set threshold value lower limit, to increase the frequency of sending the request message; and the functional unit is configured, when the message count of the stream number to which the request message belongs is higher than a set threshold value upper limit, to decrease the frequency of sending the request message.

13. The apparatus for improving the message processing efficiency of the Flash channel controller according to claim 11, wherein the functional unit is configured, when the state of the request message is normal, to determine that the request message queue has an idle position, and continuously send a request message to the request message queue.

14. The apparatus for improving the message processing efficiency of the Hash channel controller according to claim 9, wherein the request internal message queue is used for waiting for distribution to the corresponding Flash channel controller.

15. The apparatus for improving the message processing efficiency of the Hash channel controller according to claim 9, wherein the request response external message queue is used for extracting the request response message and returning the request response message to the functional unit.

16. The apparatus for improving the message processing efficiency of the Flash channel controller according to claim 9, wherein the Hash interface is configured manage all request messages and corresponding request response messages based on the one-to-one correspondence.

17. The apparatus for improving the message processing efficiency of the Flash channel controller according to claim 16, wherein the Flash interface is configured to find corresponding request response message in the request response external message queue according to any request message in the internal message queue, or find corresponding request message in the internal message queue according to any request response message in the request response external message queue.

* * * * *